US010592890B2

(12) United States Patent
Ballesteros et al.

(10) Patent No.: US 10,592,890 B2
(45) Date of Patent: Mar. 17, 2020

(54) METHODS AND ARRANGEMENTS TO COMPLETE ONLINE TRANSACTIONS

(71) Applicant: INTEL CORPORATION, Santa Clara, CA (US)

(72) Inventors: Miguel Ballesteros, Roseville, CA (US); John H. Vincent, Hillsboro, OR (US); Alan D. Bumgarner, Granite Bay, CA (US)

(73) Assignee: INTEL CORPORATION, Santa Clara, CA (US)

( * ) Notice: Subject to any disclaimer, the term of this patent is extended or adjusted under 35 U.S.C. 154(b) by 461 days.

(21) Appl. No.: 14/476,732

(22) Filed: Sep. 3, 2014

(65) Prior Publication Data
US 2016/0063480 A1 Mar. 3, 2016

(51) Int. Cl.
*G06Q 20/32* (2012.01)
*G06Q 20/20* (2012.01)
(Continued)

(52) U.S. Cl.
CPC ......... *G06Q 20/3227* (2013.01); *G06Q 20/12* (2013.01); *G06Q 20/204* (2013.01);
(Continued)

(58) Field of Classification Search
None
See application file for complete search history.

(56) References Cited

U.S. PATENT DOCUMENTS 6,430,398 B1 8/2002 Blanc
6,957,342 B2 10/2005 Vatanen
(Continued)

FOREIGN PATENT DOCUMENTS

CN 1419345 A 5/2003
CN 201408549 A 2/2010
(Continued)

OTHER PUBLICATIONS

Office action received for Korean Patent Application No. 10-20140054920, dated Mar. 6, 2015, 3 pages of KR Office action and 3 pages of English machine translation.
(Continued)

*Primary Examiner* — Allen C Chein
*Assistant Examiner* — Denisse Y Ortiz Roman

(57) ABSTRACT

Logic to perform a point of sale (POS) transaction as Card Present. Logic may communicate with a web site of an online vendor to process a payment to the online vendor as a certified POS device. Logic may communicate with a payment service provider associated with the online vendor to process the payment in response to communicating with the web site. Logic may interact with a card reader to obtain a packet to process the payment with a payment instrument to verify the presence of the payment instrument. Logic may encrypt communications to transmit an authorization request to the payment service provider to process the payment with encrypted communications via a secure element agent of the certified POS device, the authorization request to comprise the packet to verify that the payment instrument is present for the transaction. And logic may receive an approval of the authorization request for the payment.

20 Claims, 5 Drawing Sheets

(51) Int. Cl.
*G06Q 20/34* (2012.01)
*G06Q 20/40* (2012.01)
*G06Q 20/12* (2012.01)

(52) U.S. Cl.
CPC ....... *G06Q 20/3278* (2013.01); *G06Q 20/353* (2013.01); *G06Q 20/409* (2013.01)

(56) References Cited

U.S. PATENT DOCUMENTS

| | | | |
|---|---|---|---|
| 7,292,999 B2* | 11/2007 | Hobson | G06Q 20/02 705/64 |
| 7,325,250 B1 | 1/2008 | Barclay et al. | |
| 7,762,470 B2 | 7/2010 | Finn et al. | |
| 8,078,873 B2 | 12/2011 | Shah et al. | |
| 8,107,967 B2 | 1/2012 | Horiuchi et al. | |
| 8,118,218 B2 | 2/2012 | Koh et al. | |
| 8,352,323 B2* | 1/2013 | Fisher | G06Q 20/20 455/406 |
| 8,538,332 B2 | 9/2013 | Huomo et al. | |
| 8,666,368 B2 | 3/2014 | Schell et al. | |
| 8,676,249 B2* | 3/2014 | Rosenberg | 455/41.2 |
| 8,700,729 B2 | 4/2014 | Dua | |
| 8,775,305 B2* | 7/2014 | Pointer | H04L 9/3234 705/39 |
| 8,831,677 B2 | 9/2014 | Villa-Real | |
| 8,942,628 B2 | 1/2015 | Haverinen | |
| 8,996,002 B2 | 3/2015 | Rodgers et al. | |
| 9,020,423 B2 | 4/2015 | Naniyat et al. | |
| 9,083,679 B2 | 7/2015 | Teruyama | |
| 9,100,393 B2 | 8/2015 | Schell et al. | |
| 9,319,088 B2 | 4/2016 | Ballesteros et al. | |
| 9,419,970 B2 | 8/2016 | Haggerty et al. | |
| 9,792,603 B1* | 10/2017 | Gailloux | G06Q 20/3227 |
| 2002/0133467 A1* | 9/2002 | Hobson | G06Q 20/02 705/64 |
| 2003/0235165 A1 | 12/2003 | Wang | |
| 2007/0079362 A1 | 4/2007 | Lortz et al. | |
| 2009/0275364 A1 | 11/2009 | Morel et al. | |
| 2009/0327724 A1 | 12/2009 | Shah et al. | |
| 2012/0130838 A1* | 5/2012 | Koh | G06Q 20/352 705/26.1 |
| 2012/0238207 A1 | 9/2012 | Marcovecchio et al. | |
| 2012/0317019 A1* | 12/2012 | Carnes | H04L 9/3234 705/39 |
| 2013/0139230 A1 | 5/2013 | Koh et al. | |
| 2013/0152185 A1 | 6/2013 | Singh et al. | |
| 2013/0257589 A1 | 10/2013 | Mohiuddin et al. | |
| 2014/0136350 A1* | 5/2014 | Savolainen | G06Q 20/3229 705/17 |
| 2014/0335798 A1 | 11/2014 | Ballesteros et al. | |
| 2014/0337227 A1 | 11/2014 | Dua | |
| 2015/0081461 A1 | 3/2015 | Adrangi et al. | |
| 2016/0063480 A1 | 3/2016 | Ballesteros et al. | |
| 2016/0269080 A1 | 9/2016 | Ballesteros et al. | |

FOREIGN PATENT DOCUMENTS

| | | | |
|---|---|---|---|
| CN | 101667163 A | | 3/2010 |
| CN | 202795600 | * | 3/2013 |
| EP | 2068576 A1 | | 6/2009 |
| JP | 2002-524808 A | | 8/2002 |
| JP | 2006333532 A | | 12/2006 |
| JP | 2007-150970 A | | 6/2007 |
| JP | 2013058926 A | | 3/2013 |
| KR | 20070027156 A | | 3/2007 |
| KR | 20130032873 A | | 4/2013 |
| WO | 00/14984 A1 | | 3/2000 |
| WO | 2008/044554 A1 | | 4/2008 |
| WO | 2011139795 A1 | | 11/2011 |

OTHER PUBLICATIONS

Office Action received for Japanese Patent Application No. 2014-095881 dated May 22, 2015, 3 pages of Office action and 3 pages of English machine translation.
Notice of Allowance received for Korean Patent Application No. 10-20140054920, dated Sep. 4, 2015, 1 page of KR Notice of Allowance and 1 page of English machine translation.
Office Action received for Japanese Patent Application No. 2014-095881 dated Nov. 20, 2015, 2 pages of JP Office action and 2 pages of English machine translation.
Office Action received for Chinese Patent Application No. 201410194258.X dated Nov. 27, 2015, 7 pages of CN Office action and 12 pages of English machine translation.
Office Action received for Chinese Patent Applications No. 201410194258.X dated Sep. 5, 2016, 8 pages of CN Office action and 12 pages of English machine translation.
Office action received for Korean Patent Application No. 10-20150063370, dated Jul. 13, 2016, 2 pages of KR Office action and 2 pages of English machine translation.
Notice of Allowance received for Korean Patent Application No. 10-20150063370, dated Jan. 3, 2017, 1 page of KR Notice of Allowance and 1 page of English machine translation.
Office Action received for Japanese Patent Application No. 2016-073848 dated May 22, 2017, 3 pages of Office action and 3 pages of English machine translation.
Office Action received for German Patent Application No. 102014104303.0 dated Oct. 26, 2016, 5 pages of Office action.
GSM Association, "Mobile NFC Infrastructure", Version 1.0, Jul. 30, 2012, 10 pages.
Office Action received for U.S. Appl. No. 14/485,306 dated Aug. 11, 2017, 22 pages.

* cited by examiner

METHODS AND ARRANGEMENTS TO COMPLETE ONLINE TRANSACTIONS

TECHNICAL FIELD

The present disclosure relates generally to the field of wireless communications technologies. More particularly, the present disclosure relates to performing online transactions as "card present" (CP) transactions instead of "card not present" (CNP) with a consumer device.

BACKGROUND

Mobile Commerce is the usage of a mobile device to access a web site or app for the purpose of buying goods/services and remotely executing a payment via the web site/app's payment service. Mobile Commerce is constantly growing in popularity as smartphones and tablets become more prevalent. Since mobile commerce transactions (mCommerce) are remote transactions with respect to the vendor, they are considered Card Not Present (CNP transactions) and incur a higher processing fee than transactions at a physical Point of Sale (POS), called Card Present (CP) transactions. The higher processing fees are assessed in the CNP transactions because the cardholder and the payment instrument are not physically present at a certified POS device at the time the payment is made. mCommerce transactions are also riskier transactions since it is easier to commit fraud by stealing account information and using it to make remote payments where the actual card is not needed to complete a CNP transaction.

There is no current solution to this problem. There are some solutions around user authentication aimed at proving the identity of the user and possession of a credit card, but for mCommerce transactions and similar transactions, the actual card is not used to conduct the transaction as is the case of a CP transaction through a physical, PCI (Payment Card Industry) certified POS, so these transactions are still considered CNP transactions.

DETAILED DESCRIPTION OF EMBODIMENTS

Figure 1:
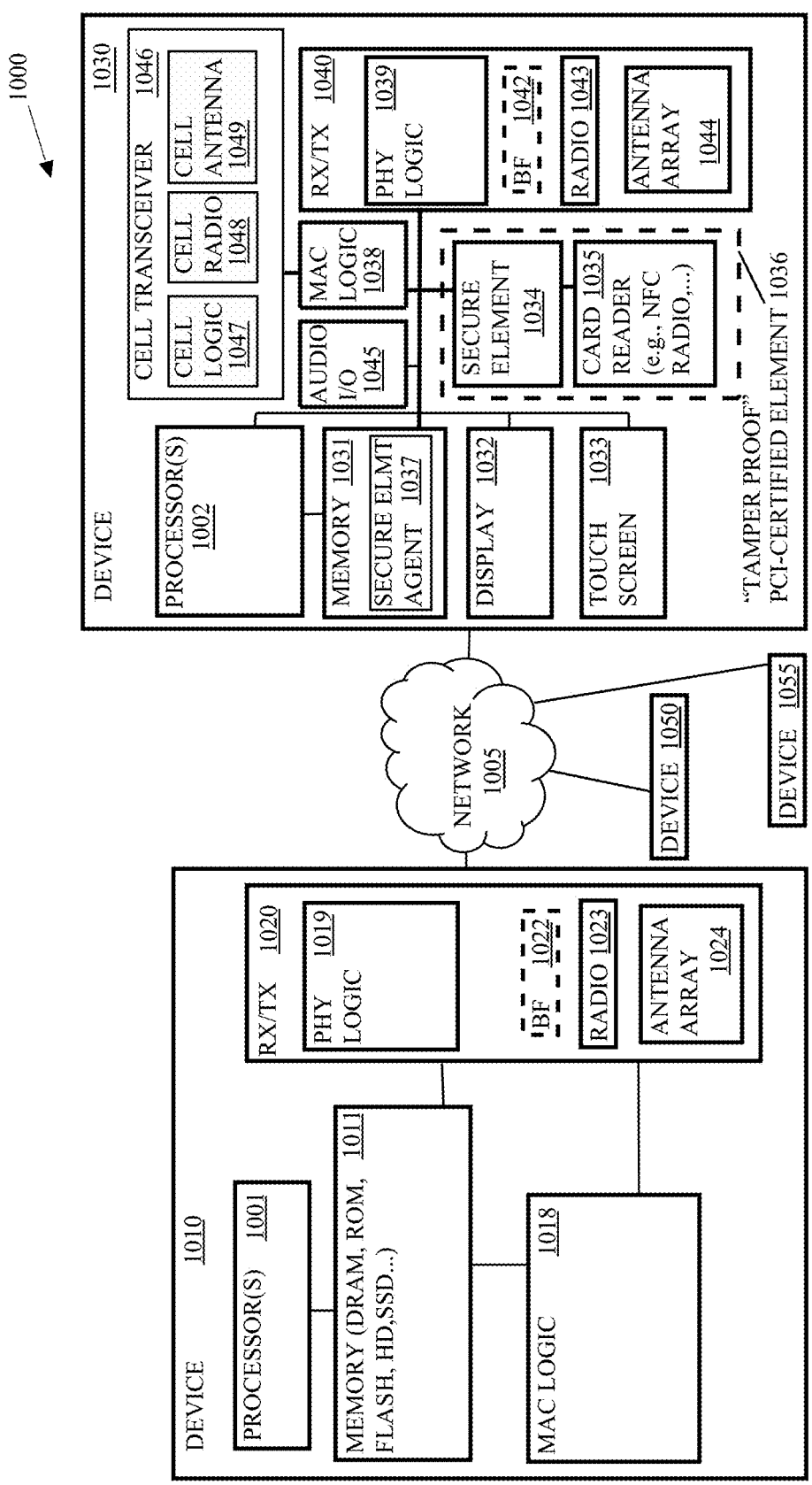
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Some of the commonly used devices do not provide any protection for sensitive data as the data is directly sent to the Application Processor where malicious SW (software) may intercept it. Better solutions may make use of a Trusted Execution Environment (TEE) within the Application Processor to protect the sensitive data as it enters the Application Processor environment, but TEEs are not certified as tamper-proof. Finally, some other solutions rely on an NFC controller and run a modified NFC controller firmware version to manage the sensitive data, but again NFC controllers are not certified as tamper proof.

Embodiments may integrate a Payment Card Industry (PCI) certified POS terminal into a consumer device itself, be it a phone, a tablet, a wearable device, etc., such that the presence of a cardholder and card are required to complete an online transaction in the same way they are required at a physical POS (i.e., the actual card is used to authorize and complete the transactions). Some embodiments use a card reader such as a magnetic reader, contacts for a contacted connection, an optical reader, and or the like. For instance, in some embodiments, the card reader comprises a magnetic strip reader. In some embodiments, the card reader comprises contacts such as electrical signal contacts to provide for contacted communication via electrical signals. Some embodiments provide support for EMV so that an EMV based payment can be conducted for online transactions. And some embodiments employ NFC (Near Field Communication) to provide a contactless solution.

NFC (Near Field Communication) is gaining wide acceptance within mobile devices and as a result, NFC radios are being included in more and more consumer devices, such as but not limited to smartphones, tablets, and Ultrabooks™. NFC technology is very flexible and has the capability of being used for countless purposes. Many of the contactless use cases are for convenience (just tap to have something useful or interesting happen) and do not require a high level of security. However, many usage cases do require a high level of security, especially when there is value associated with the information that is made available over the NFC interface. For example, contactless credit cards, contactless identity cards, and contactless access control cards (physical and logical) may contain information that can be fraudulently exploited by a malicious third party.

One way to solve this problem is to have specialized, highly secure, NFC terminal equipment that guarantees that the information is safely processed (and not leaked) when accessed from an NFC tag, contactless card, or NFC device (e.g. smartphone). Such POS equipment is sold by the payment service provider to the vendor and requires the cardholder and the card to be at the vendor near the vendor's POS equipment. Furthermore, this approach is expensive because the terminals are specialized and dedicated devices. And the vendor is effectively or actually locked into a relationship with a particular payment processing service provider for a period of time by means of a contract and/or the costs associated with the specialized, dedicated equipment that is bound to the payment service provider. As consumer devices are expanding their capabilities year over year, there is now a potential to leverage the native NFC capabilities of NFC devices to replace the specialized terminals.

Various embodiments may be designed to address different technical problems associated with CNP transactions for online purchases from online vendors. For instance, some embodiments may be designed to address one or more technical problems such as consumer devices not being designed to be as highly secure as specialized terminals, the expense of dedicated terminals for POS transactions, the dedication of terminals to specific payment service providers, the dedication of terminals to specific merchants, and the like.

Different technical problems such as those discussed above may be addressed by one or more different embodiments. For instance, some embodiments that address CNP transactions for online purchases from online vendors may do so by one or more different technical means such as verifying the presence of a card remotely from a vendor via a network, verifying the presence of a card without a device dedicated for a particular vendor, verifying the presence of a card without a device dedicated for a particular payment service provider, incorporating a PCI certified secure element and card reader in a device, communicating by a device with a payment service provider to process a payment as a certified Point of Sale (POS) device for an online vendor, encrypting communications to create encrypted communications to protect the communications from tampering by the applications processor of a processing device, encrypting communications to create an encrypted channel or tunnel for the communications between a secure element of a processing device and the payment service provider to verify the presence of a card of a cardholder, transmitting an authorization request to the payment service provider to process the payment with the encrypted communications via a secure element agent of the processing device, receiving an approval of the authorization request for the payment, receiving a completed payment session communication from the payment service provider, activating a near field communication radio to interact with an EMV (Europay, MasterCard and Visa) card to process the payment, communicating a message from the payment service provider to a user to prompt the user to process the payment with the payment instrument and the card reader, dynamically binding the secure element of an apparatus as a POS device to the online vendor to process a payment by a user of the processing device for the online vendor via direct interaction between the secure element and the payment service provider, dynamically binding the secure element of a processing device as a POS device to the payment service provider to process a payment by a user of the processing device for the online vendor via direct interaction between the secure element and the payment service provider, and the like.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf) and other related wireless standards.

Several embodiments comprise mobile devices or stations (STAs) such as netbooks, mobile devices (Laptop, Smart Phone, Tablet, and the like), as well as televisions, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and cellular phone technologies. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices such as the communication devices 1030, 1050, and 1055 via the network 1005. The communications device 1010 may comprise a server of a payment service provider. The communications device 1030 may comprise processing devices or other devices with a contactless POS that is PCI certified as "tamper-proof" such as sensors, stations, appliances, computers, laptops, netbooks, cellular phones, smart phones, PDAs (Personal Digital Assistants), or other wireless-capable devices. The communications device 1050 may comprise a server comprising a web site of an online vendor or merchant that can be reached by the communications device 1030 online via, e.g., the Internet. And communications devices 1055 may be a server of a payment instrument issuer such as the bank that issues a credit card or EMV card. Thus, communications devices may be mobile or fixed.

Note that the term vendor, as discussed herein, may generally sell any raw materials, goods, or services to a customer such as a consumer or user. The terms customer, consumer, and user may refer to a person or an entity that resides anywhere in the supply chain from a distributor to an end-consumer. The vendor may or may not also refer to a manufacturer and/or distributor. The term merchant, as used herein, may typically refer to a seller of goods. And the phrases online vendor or online merchant may refer a presence of the vendor or merchant as a web site on an area network such as the Internet or other network that is accessible by multiple entities and/or persons.

A user of the communications device 1030 may use the touch screen 1033 on a display of the communications device 1030 to execute a web browser or app to access an online vendor web site on the communications device 1050 to purchase some goods and/or services via the network 1005. After placing one or more items in the cart for the online vendor, the user may choose a function for checking out, or purchasing, the items in the cart.

Figure 1A:
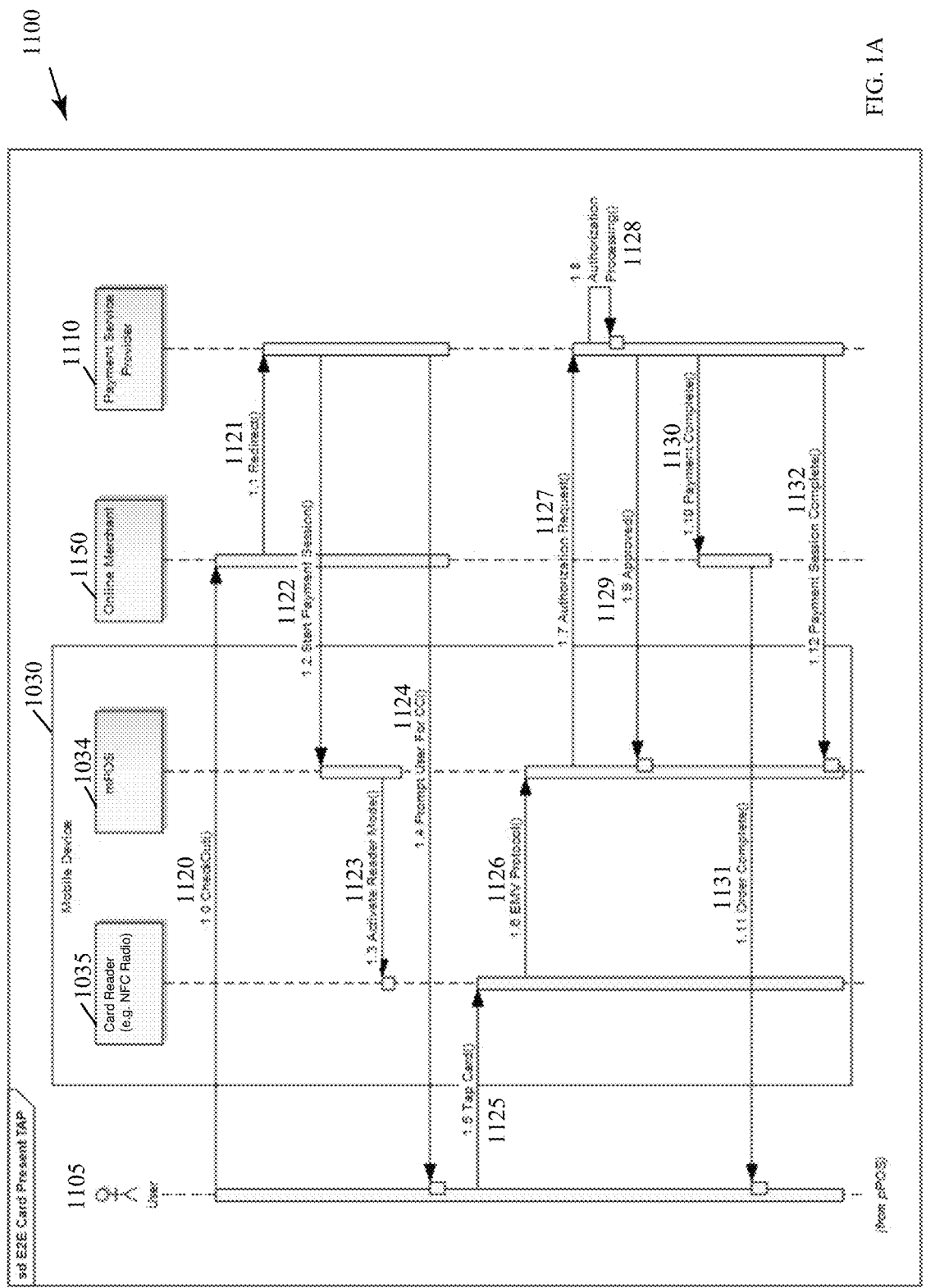
FIG. 1A depicts an embodiment of communication flow to perform an mCommerce transaction in which a mobile device functions as a certified POS device to process a payment to an online vendor as a Card Present transaction.

Referring also to FIG. 1A, there is shown an embodiment of communication flow 1100 to perform an mCommerce transaction as a Card Present transaction. After the user 1105 confirms the intention to purchase the items in the cart and possibly other merchant specific interactions, the online merchant 1150 (represented by the web site on the communication device 1050 in FIG. 1) may dynamically bind a secure element 1034 as a PCI certified POS device to the online merchant 1150 to process a payment by a user 1105 of the communications device 1030 for the merchant. In many embodiments, the online merchant 1150 may bind the secure element 1034 to the payment service provider 1110 by redirecting communications from the secure element 1034 to the payment service provider 1110 (represented by the communication device 1010 in FIG. 1). Dynamic binding may involve the binding of the communications device 1030 to any online merchant during the process of making a purchase. Binding may involve temporary association of the communications device 1030 with the particular online merchant 1150 for the purposes of processing a payment to the online merchant 1150 by the payment service provider 1110 for items in the cart.

Once the user 1105 confirms the purchase of the items in the cart, the online merchant 1150 redirects 1121 the communications from the communications device 1030 to the payment service provider 1110. Binding may be temporary and may occur before or during the redirection 1121 of the communications from the communications device 1030 to the payment service provider 1110. For instance, the online merchant 1150 may establish communications with the payment service provider 1110 through a secure communications channel that uniquely identifies the online merchant 1150. In further embodiments, the online merchant 1150 may communicate with the payment service provider 1110 to initiate a transaction for the payment that is associated with the online merchant or the online merchant's account prior to or while redirecting 1121 the communications from the communications device 1030 to the payment service provider 1110.

In some embodiments, redirection 1121 of the communications may involve communications via the same network 1005, e.g., the Internet, as the communications between the communications device 1030 and the online merchant 1150. In other embodiments, the redirection 1121 of the communications may involve the user 1105 connecting with the payment service provider 1110 via a different network or communications channel such as a cellular data network, a telephone line, an Ethernet network, or a wireless network to process the payment with the payment service provider 1110.

In response to redirection 1121 by the online merchant 1150 of communications with the user 1105 during the checkout process 1120, the payment service provider 1110 may start a payment session 1122 with the communications device 1030. In some embodiments, at the start of or during the payment session 1122, the payment service provider 1110 may dynamically bind the secure element 1034 of the communications device 1030 as a certified POS device to the payment service provider 1110 to process a payment by the user 1105 for the online merchant 1150 via direct interaction between the secure element 1034 and the payment service provider 1110. In some embodiments, the dynamic binding may involve communicating one or more encryption/decryption keys between the mobile device 1030 and the payment service provider 1110.

The direct interaction between the secure element 1034 and the payment service provider 1110 may involve the use of a secure element agent 1037 such as an application executing on the processor(s) 1002 of the communications device 1030. The secure element agent 1037 may be configured to pass encrypted communications from the payment service provider 1110 to the secure element 1034 and from the secure element 1034 to the payment service provider 1110. In many embodiments, the secure element agent 1037 is unable to decrypt the encrypted communications between the payment service provider 1110 and the secure element 1034.

After the payment service provider 1110 starts a payment session 1122, the secure element 1034 may activate 1123 the card reader 1035. In some embodiments, the card reader 1035 may comprise a contactless reader such as an NFC radio, a magnetic reader, and/or an optical reader. In some embodiments, the card reader 1035 may comprise a contacted reader such as one or more electrical contacts, one or more optical contacts, a magnetic reader, and/or an optical reader.

The payment service provider 1110 may transmit a message to the user 1105 via the card reader 1035 to effectively inform or prompt 1124 the user 1105 to couple the payment instrument with the card reader 1035 by placing the payment instrument near enough to or in contact with the communications device 1030 to communicate with the card reader 1035. In many embodiments, the message may be displayed on the display 1032 of the communications device 1030 or sounded via speakers of the audio input-output (I/O) 1045 of the communications device 1030. In some embodiments, the card reader 1035 may require physical contact with the payment instrument to interact with the payment instrument and the mobile device 1030 may prompt 1124 the user 1105 to physically couple the payment instrument with the card reader 1035. In several embodiments, the payment instrument may be powered by the card reader 1035 and, in other embodiments, the payment instrument may include a power source to facilitate communications with the card reader 1035.

In several embodiments, the secure element 1034 and the card reader 1035 may be part of a "tamper-proof" PCI-certified element 1036. In some embodiments, the secure element 1034 and/or the card reader 1035 may be a detachable attachment coupled with the communications device 1030. In some embodiments, the secure element 1034 and/or the card reader 1035 may be a die in the same chip package as the processors 1002, memory 1031, audio I/O 1045, MAC logic 1038, transceiver (RX/TX) 1040, and/or the cell transceiver 1046. Further embodiments may comprise a System on a Chip (SOC) comprising the secure element 1034 and/or the card reader 1035 with the processors 1002, memory 1031, audio I/O 1045, MAC logic 1038, transceiver (RX/TX) 1040, and/or cell transceiver 1046. In one embodiment, the processors 1002, memory 1031, audio I/O 1045, MAC logic 1038, transceiver (RX/TX) 1040, and/or cell transceiver 1046 are on the same die as the secure element 1034 and/or the card reader 1035. And, in another embodiment, the secure element 1034 comprises an embedded system isolated via a hardware isolation scheme from a main operating system for the communications device 1030 but sharing processor cycles or utilizing one or more processors or processor cores of the processor(s) 1002. In several of these embodiments, the secure element 1034 may operate independently from the main operating system of the communications device 1030.

In response to the message, the user 1105 may tap 1125 the payment instrument on the card reader 1035. In other embodiments, the user 1105 may couple 1125 the payment instrument or card with the card reader 1035 via contact or via another contactless protocol to proceed with the payment session 1122. In some embodiments, the mobile device 1030 may comprise a marking or written indication on the mobile device 1030 that indicates the location of the card reader 1035 and/or how to use the card reader 1035. For example, a card reader 1035 may comprise a magnetic and/or optic reader to read or interact with a magnetic medium or optic medium on the payment instrument or may comprise contacts to read or interact with a processor or memory on the payment instrument.

After the card reader 1035 communicates with the payment instrument, the card reader 1035 may transmit data, e.g., via an EMV protocol 1126, determined from communication with the payment instrument to the secure element 1034. In many embodiments, the data is encrypted for form an encrypted packet such as a cryptogram.

After receipt of the encrypted packet from the card reader 1035, the secure element 1034 may transmit the encrypted packet to the payment service provider 1110 to request authorization for the payment 1127. In many embodiments, the secure element 1034 may transmit the encrypted packet in or along with encrypted communications between the secure element 1034 and the payment service provider 1110 via the secure element agent 1037 to verify that the payment card is physically present.

In several embodiments, the secure element 1034 may also transmit to the payment service provider 1110 information or data requested from or determined from the user 1105 to verify the identity of the user 1105 as the cardholder. The information to verify the identity of the cardholder may include one or more personal identifiers such as a personal identification number (PIN), a mother's maiden name, a portion of an identification number such as a social security number or a driver's license number, and/or the like. In some embodiments, the secure element 1034 may transmit a personal identifier such as the PIN determined from communications with the user 1105 in encrypted communications along with the encrypted packet transmitted to the payment service provider 1110 to request authorization for the payment to the online merchant 1150. In many embodiments, the personal identifier is sent in a different packet from the encrypted packet. In further embodiments, the secure element 1034 may transmit the encrypted packet determined from communications with the payment instrument alone to the payment service provider 1110 to request authorization for the payment to the online merchant 1150.

In some embodiments, the payment service provider 1110 may select a personal identifier from a group of personal identifiers and request that the secure element return the particular personal identifier as part of a cardholder verification procedure. In other embodiments, the secure element 1034 or the payment instrument may identify one or more personal identifiers to transmit to the payment service provider 1110 to verify the identity of the cardholder. For example, the payment instrument may generate a number in addition to the encrypted packet that identifies one or more particular personal identifiers to include with the encrypted packet to verify the identity of the cardholder.

After receipt of the authorization request 1127 with the encrypted packet determined from the payment instrument, the payment service provider 1110 may process the payment. In several embodiments, processing the payment may involve verifying that the data in the encrypted packet determined from the payment instrument matches data that is expected from the payment instrument to verify that the payment instrument is a valid payment instrument. In several embodiments, processing the payment may involve verifying the identity of the cardholder by verifying that the one or more personal identifiers match the expected personal identifiers associated with the payment instrument and, in some embodiments, associated with the encrypted packet.

If the encrypted packet determined from the payment instrument validates the payment instrument and, in some embodiments, if the one or more personal identifiers verify the identity of the cardholder, the payment service provider 1110 or a server in communication with the payment service provider 1110 may present the payment information for the online merchant 1150 for authorization processing 1128. In several embodiments, the payment information may be presented to a bank such as the bank that issued the payment instrument to the cardholder to determine if the payment to the online merchant is approved.

If the payment is approved, the payment service provider 1110 may transmit an indication of the approval 1129 to the secure element 1034, an indication of the payment completion 1130 to the online merchant 1150, and terminate the payment session 1132 between the payment service provider 1110 and the secure element 1034. In many embodiments, the issuing bank of the payment instrument such as the communications device 1055 may process the payment to transmit the payment to the online merchants 1150 account. And, in several embodiments, the online merchant 1150 may transmit an indication to the user 1105 that the payment or order is completed 1131.

Figure 1B:
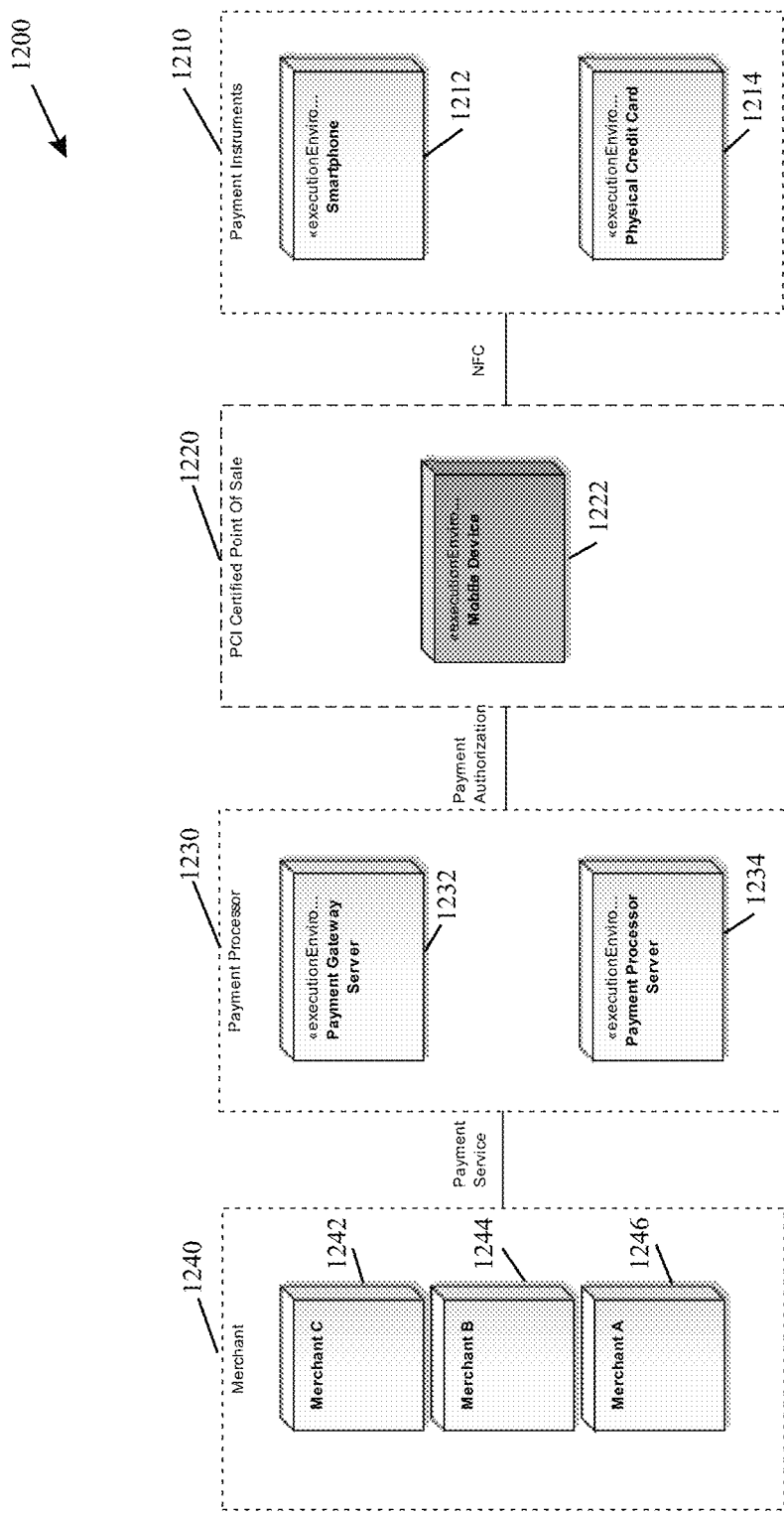
FIG. 1B depicts an embodiment of a process of an mCommerce transaction device to process a payment to an online vendor as a Card Present transaction.

FIG. 1B illustrates an embodiment of a process of an mCommerce transaction 1200 the may be accomplished with communication devices such as the communications devices 1010, 1030, 1050, and 1055 in FIG. 1. The mCommerce transaction 1200 involves the use of one or more payment instruments 1210 to make a payment to an online merchant 1240. The one or more payment instruments 1210 may comprise, for example, a smartphone 1212 and/or a physical credit card 1214. To illustrate, the smartphone 1212 may include an embedded payment instrument system with an application that is protected from tampering and/or view such as a secure element (SE) or a trusted platform module (TPM) that includes a processor, code, and memory. In further embodiments, the smartphone 1212 may include a state machine in lieu of or in addition to the processor, code, and memory. The physical credit card 1214 may include a processor, code, and memory or a state machine. In other embodiments, the smartphone 1212 and/or physical credit card 1214 may comprise at least one of a magnetic medium, an optical medium, a memory, another type of medium, a processor, or a state machine and an interface to facilitate communication with a card reader on the certified POS 1220.

The one or more payment instruments 1210 may interact with a PCI certified POS device 1220 via an NFC card reader to provide data such as a random number that can verify the identity of the payment instrument to a payment service provider, which is embodied by a payment processor 1230 in the present embodiment. In many embodiments, the data provided by the one or more payment instruments 1210 is encrypted. In some embodiments, the PCI certified POS device 1220 may comprise a mobile device 1222. In further embodiments, the PCI certified POS device 1220 may comprise any processing device such as a desktop computer, a notebook, a laptop, an Ultrabook™, a smartphone, a personal digital assistant, a navigation device, a wearable device, or the like.

In the present embodiment, the PCI certified POS device 1220 may transmit the data provided by the one or more payment instruments 1210 directly to the payment processor 1230 rather than to the online merchant 1240 unlike traditional transactions in which the data would be presented to the merchant's POS device. The data provided by the one or more payment instruments 1210 may verify the presence of the payment instrument(s) 1210 due to the physical requirement to couple the one or more payment instruments 1210 with the PCI certified POS device 1220. And, in several embodiments, the PCI certified POS device 1220 may also transmit information to verify the identification of the cardholder to verify the presence of the cardholder at the PCI certified POS device 1220.

The payment processor 1230 may receive the data provided by the one or more payment instruments 1210 as an authorization request to process a payment for the online merchant 1240. In some embodiments, the payment processor 1230 may include a payment processor gateway 1232, also referred to as a payment gateway server, and a payment processor server 1234. The payment processor gateway 1232 may provide access to the payment processor server 1234 via one or more networks such as the Internet, another wide area network, a municipal area network, a local area network, a personal area network, wireless area network, a digital telephone line, an analog telephone line, a cellular phone line, a cellular data line, and/or the like.

The payment processor server 1234 may authenticate the one or more payment instruments 1210, verify the presence of the cardholder at the PCI certified POS device 1220, and process the payment authorization. In many embodiments, the payment authorization may be performed by other servers via the payment processor gateway 1232 such as by one or more servers representative of a Europay network, a Visa network, a MasterCard network, an American Express network, or other credit card network as well as a network representative of the bank(s) that issued the one or more payment instruments 1210.

After processing the payment, the payment processor 1230 may issue the payment to the online merchant account for one or more online merchant(s) 1240 associated with the payment from the user. In some embodiments, for example, the online merchant 1240 may represent one or more merchants such as merchant 1242, merchant 1244, and merchant 1246. In some of these embodiments, the payment processor 1230 may process more than one payment from the one or more payment instruments 1210 for the one or more online merchants 1240.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise one or more data processing devices such as microprocessors, microcontrollers, state machines, and the like. The memory 1011 and 1031 may comprise a storage medium such as Dynamic Random Access Memory (DRAM), read only memory (ROM), buffers, registers, cache, flash memory, hard disk drives, solid-state drives, or the like. In many embodiments, the memory 1011 and 1031 may comprise applications or other code that a user may generally use. For instance, in some embodiments, the communications device 1030 may comprise a smartphone and the memory 1031 may comprise an operating system and a phone application for placing calls via a cell transceiver 1046. In several embodiments, the communications device 1030 may comprise a processing device such as a desktop or mobile computer and the memory 1031 may comprise utilities and business applications.

The memory 1011 and 1031 may also store frames and/or frame structures such as standard frames and frame structures identified in IEEE 802.11 for wireless communications. Note also that memory 1011 and 1031 may reside in a system or in proximity to or in the MAC sublayer logic 1018 and 1038 or the transceivers (RX/TX) 1020 and 1040.

Medium access control (MAC) sublayer logic (MAC logic) 1018 and 1038 may comprise logic to implement functionality of the MAC sublayer of the data link layer of the communications devices 1010 and 1030, respectively. The MAC logic 1018 and 1038 may generate the frames such as management frames, data frames, and control frames, and may communicate with the PHY logic 1019 and 1039, respectively, to transmit the frames. The PHY logic 1019 and 1039 may generate physical layer protocol data units (PPDUs) based upon the frames. More specifically, frame builders of the MAC logic 1018 and 1038 may generate the frames and data unit builders of the PHY logic 1019 and 1039, respectively, may prepend the frames with preambles to generate PPDUs for transmission via a physical layer device such as the transceivers (RX/TX) 1020 and 1040, respectively.

The communications devices 1010, 1030, 1050, and 1055 may each comprise a transceiver such as transceivers 1020 and 1040. Each transceiver 1020 and 1040 comprises a radio 1023 and 1043, respectively, comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

The communications devices 1010, 1030, 1050, and 1055 may communicate with the network 1005 wirelessly via the transceivers 1020 and 1040, physically through network interface cards (not shown), wirelessly through cell transceivers such as the cell transceiver 1046 or by other network means. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. Guard interval may be inserted between symbols such as the short training field (STF) and long training field (LTF) symbols during transmission to avoid inter-symbol interference (ISI), which might result from multi-path distortion. Guard tones help the signal conform to a spectral mask. The nulling of the direct component (DC) may be used to simplify direct conversion receiver designs.

In some embodiments, the communications device 1010 optionally comprises a Beam Former (BF) 1022, as indicated by the dashed lines. The BF 1022 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a BF 1042.

In the present embodiment, the communications device 1030 may also comprise cellular phone communications capabilities. The MAC logic 1038 may prepare audio and data packets for transmission through the cell transceiver 1046 based upon the technologies associated with the communications device 1030. For instance, the cell transceiver 1046 may comprise cell logic 1047, a cell radio 1048, and a cell antenna 1049 to implement 3G or 4G wireless standards that may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth.

The cell logic 1047 may encode and modulate packets for transmission and demodulate and decode packets for reception. The cell radio 1048 may amplify and convert the signals into radio signals for transmission via the cell antenna 1049. And the cell radio 1048 may receive, amplify and convert the signals from radio signals for reception via the cell antenna 1049. In some embodiments, the communications device 1030 may also comprise a subscriber identification module (SIM). The SIM may be an integrated circuit that securely stores the international mobile subscriber identity (IMSI) and the related key used to identify and authenticate subscribers on mobile telephony devices (such as mobile phones and computers).

In some embodiments, the SIM may contain data that can be used to verify the presence of a cardholder for a payment transaction with an online merchant 1150. In further embodiments, the SIM may contain data that can be used to verify the presence of a payment instrument for a payment transaction with an online merchant 1150. In several embodiments, the cellular transceiver 1046 may be used for communications between the payment service provider 1110 and the secure element 1034.

Figure 2:
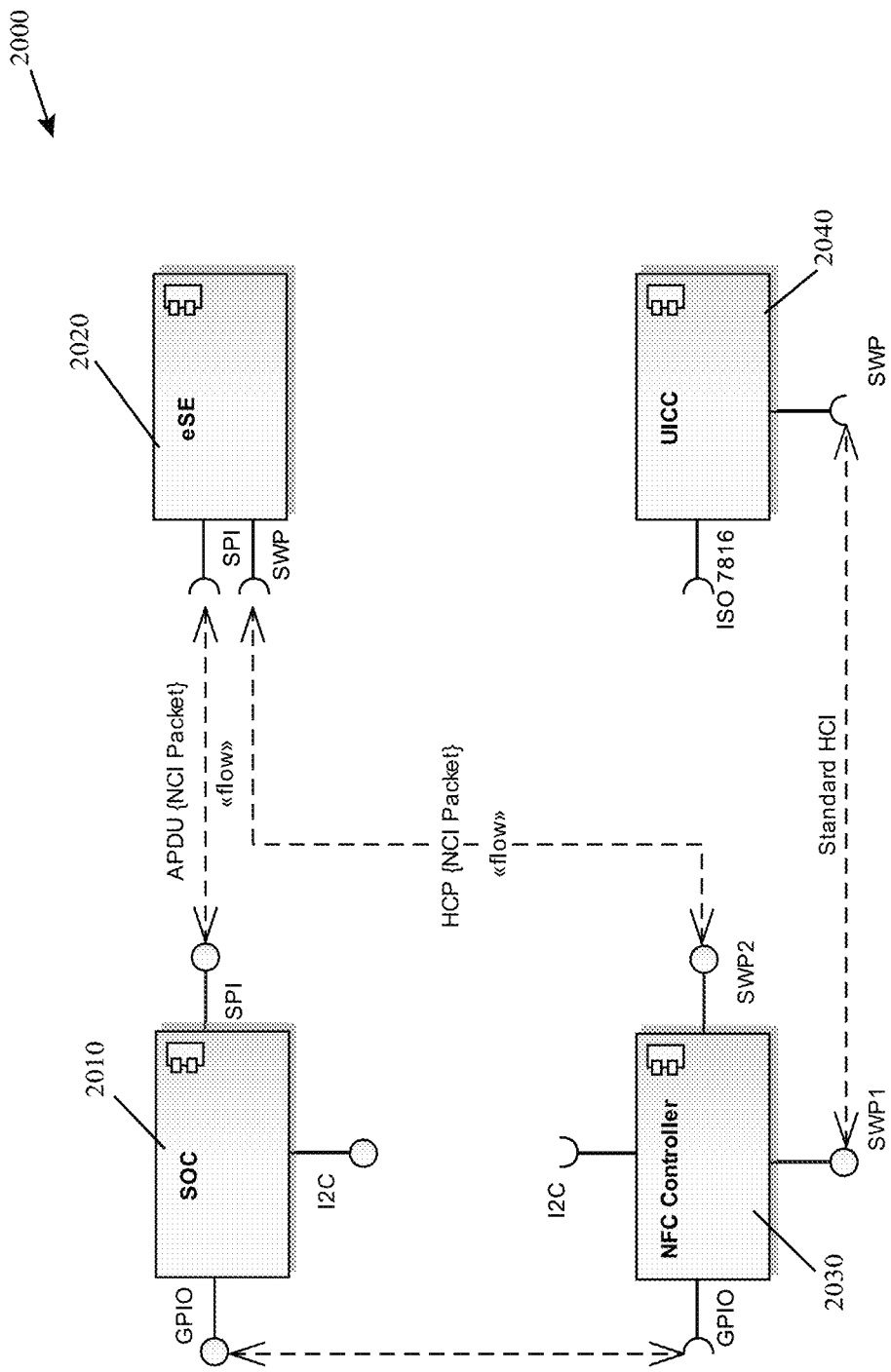
FIG. 2 depicts an embodiment of a mobile device to process a payment to an online vendor as a Card Present transaction.

FIG. 2 depicts an embodiment of a mobile device 2000 to verify the presence of a payment instrument such as a card and, in some embodiments, a cardholder to process a payment for an online merchant as a Card Present Transaction (CP) rather than a Card Not Present (CNP) transaction even though the cardholder is not physically located at or near a POS owned by the online merchant. The mobile device 2000 may be a certified POS device that the cardholder can use to verify the presence of a payment instrument as well as the presence of the cardholder so a transaction with the merchant can be verified as a CP and cardholder present transaction.

In the present embodiment, the mobile device 2000 may comprise a system-on-chip (SOC) processor 2010, an embedded secure element (eSE) 2020, a Near Field Communications (NFC) Controller 2030, and a subscriber identification module (SIM) 2040. The mobile device 2000 may comprise the SOC processor 2010 as a main processing unit for the mobile device 2000. The SOC processor 2010 may represent one or more processors that are configured to perform general and specific operations of the phone. In many embodiments, a main operating system may execute on the SOC processor 2010 to execute applications to interface with a user via, e.g., a graphical user interface. In some embodiments, the mobile device 2000 may comprise a cellular phone, smartphone, laptop, notebook, MP3 player, wearable processing device, or other mobile processing device. In other embodiments, the mobile device 2000 may be a stationary processing device such as a desktop computer, workstation, and/or the like.

In many embodiments, the SOC processor 2010 may comprise a network controller to connect to a network such as the Internet or another network via a wired and/or wireless connection. In some embodiments, the SOC processor 2010 may also comprise memory and an input-output controller to implement the functionality of the mobile device 2000.

The mobile device 2000 may comprise a tamper-proof component eSE 2020 at the center of the architecture. In this tamper-proof centric architecture, the NFC controller 2030 is physically (as opposed to virtually) isolated from the SOC processor 2010 (or main processor unit) by removing or not implementing the data path between the NFC controller 2030 and the SOC processor 2010 indicated by the "interface not wired" label on the Inter-Integrated Circuit or I-squared-C (I2C) bus connections of the SOC processor 2010 and the NFC controller 2030. Instead, the SOC processor 2010 is connected to the eSE 2020 via, e.g., a serial peripheral interface (SPI) connection and the eSE 2020 is connected to the NFC controller 2030. In this way, the highly sensitive data received over the NFC controller 2030 interface is sent directly and exclusively to the eSE 2020, where it can be securely processed without exposing such sensitive data directly to the SOC Processor 2010 and the software (e.g. Android, Windows, etc.) running on the SOC processor 2010, which may be compromised and/or malicious.

Note that the general purpose input-output (GPIO) may interconnect the SOC processor 2010 with the NFC controller 2030 without compromising the security because the GPIO interface on the NFC controller 2030 is not capable of a sufficiently complex communication with the SOC processor 2010 to compromise security.

The eSE 2020 may be a smart card chip that stores information, manages security and provides a firewall between NFC applications and other elements in the mobile device 2000. In several embodiments, the eSE 2020 may also be a tamper resistant Smart Card chip that facilitates the secure storage and transaction of payment and other sensitive credentials. Secure elements may be used in multi-application environment and can be available in multiple form factors like Plastic Smart Cards, UICC(SIM)s, eSEs, micro secure digital (microSD) cards, etc.

In several embodiments, the eSE 2020 may comprise one or more of a Secure Microcontrollers, a processing unit, an Operating System, Memory, Immutable (ROM), Mutable Electrical Erasable Programmable Read Only Memory (EE-PROM), Volatile Random Access Memory (RAM), Crypto Engine, Sensor, Timer, Communication Ports, and/or the like.

In the present embodiment, the eSE 2020 may be formally evaluated and certified by EMVco and/or Common Criteria standard procedures and suitable for highly secure use cases within the payment card industry (PCI) (i.e., to make and receive payment), Mobile Subscription Management, Identity Management, strong Authentication, etc.

It is to be noted that while at present embodiment comprises the eSE 2020, embodiments may comprise any tamperproof architecture to protect data from access by malicious or compromised software. For example, tamper-proof protection such as the eSE 2020 may be integrated into SOC processor 2010 thereby displacing the discrete eSE 2020 in favor of an integrated solution.

In the present embodiment, the eSE 2020 may comprise logic such as hardware and/or code to perform a point of sale (POS) transaction with an online vendor as a Card Present transaction rather than a Card Not Present transaction by implementing PCI certified POS functionality. In many of these embodiments, the eSE 2020 may couple with the NFC controller 2030 to communicate with a web site of the online vendor to process a payment to the online vendor as a certified POS device rather than transmitting payment instrument information to the online vendor to use the online vendor's POS device.

Once the user of the mobile device 2000 indicates that the user intends to complete a payment to the online vendor such as a payment for goods or services, the online vendor may redirect communications from the eSE 2020 to the payment service provider so the eSE 2020 may communicate directly with the payment service provider associated with the online vendor to process the payment. In many embodiments, the eSE 2020 may interact with the NFC controller 2030 to obtain a packet to process the payment with a payment instrument and encrypt communications to transmit an authorization request to the payment service provider to process the payment with encrypted communications. The direct interaction between the certified POS device (eSE 2020) and the payment instrument via the NFC controller 2030 may verify that the payment instrument is present to constitute a card present transaction.

Furthermore, in several embodiments, the eSE 2020 may verify that the cardholder is present by prompting the cardholder to couple the payment instrument to the NFC controller 2030. In some embodiments, the eSE 2020 may verify that the cardholder is present by prompting the cardholder for a personal identifier and either passing the personal identifier to the payment service provider or comparing the personal identifier with data on the SIM 2040.

The SIM 2040 may store network-specific information used to authenticate and identify subscribers on the cellular network. The network-specific information may comprise the ICCID, IMSI, Authentication Key (Ki), Local Area Identity (LAI) and Operator-Specific Emergency Number. The SIM 2040 may also store other carrier-specific data such as the SMSC (Short Message Service Center) number, Service Provider Name (SPN), Service Dialing Numbers (SDN), Advice-Of-Charge parameters and Value Added Service (VAS) applications.

The SIM 2040 may comprise a SIM card with a unique integrated circuit card (UICC) identifier (ICCID). ICCIDs may be stored in the SIM cards and also engraved or printed on the SIM card body during a process called personalization. In many embodiments, the ICCID number may be up to 22 digits long, including a single check digit calculated using a Luhn algorithm. In some embodiments, the ICCID length may be 10 octets (20 digits) with an operator-specific structure. In other embodiments, the SIM 2040 may comprise a different number or code with the same of different length.

Figure 3:
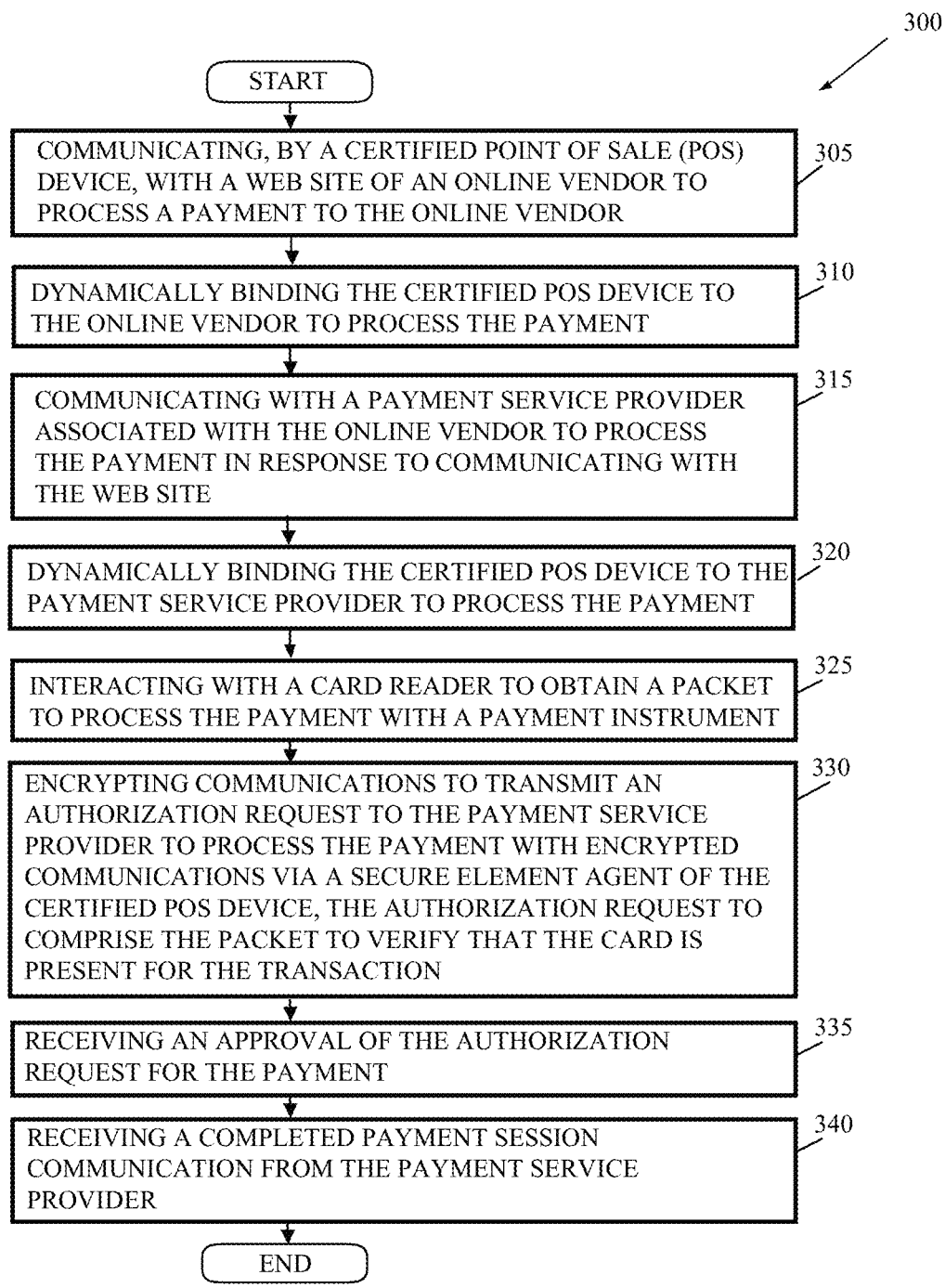
FIG. 3 depicts an embodiment of a flowchart of a transaction in which a personal processing device functions as a certified POS device to process a payment to an online vendor as a Card Present transaction.

FIG. 3 illustrates an embodiment of a flowchart 300 of a transaction in which a personal processing device functions as a certified POS device to process a payment to an online vendor as a Card Present transaction. The flowchart 300 begins with communicating, by the personal processing device as a certified Point of Sale (POS) device, with a web site of an online vendor to process a payment to the online vendor (element 305). In many embodiments, a cardholder may shop on the online vendor's web site with the personal processing device. After selecting one or more items to purchase, the cardholder may interact with the web site to begin a process of completing the purchase of the items. In some embodiments, once the cardholder reaches a point at which payment is the only remaining step to complete the transaction to purchase the items, the online vendor's web site may redirect the cardholder's web browser to a payment service provider's web site to complete the transaction. In further embodiments, the online vendor's web site may open a web portal to the payment service provider's web site to complete the transaction.

In many embodiments, the process of redirecting the personal processing device to the payment service provider's web site to complete the transaction may involve providing sufficient information to the payment service provider to dynamically associate or bind the certified POS device to the online vendor (element 310). In several embodiments, the online vendor's web site may provide information about the transaction to the associate or dynamically bind the transaction with the online vendor's merchant account and the certified POS device (element 320).

After connecting to the payment service provider's web site, the personal processing device may communicate with a payment service provider to process the payment (element 315). In many embodiments, the payment service provider may transmit a message or an indication of a message to the secure element of the personal processing device to prompt the cardholder to couple the payment instrument or card with the personal processing device to process the payment with the payment instrument and the card reader. In some embodiments, the direct interaction between the secure element and the payment service provider may dynamically bind the certified POS device to the payment service provider to process the payment by a user of the certified POS device for the online vendor (element 320).

After the payment service provider transmits the message or indication to the secure element, the secure element may respond by activating a near field communication radio to interact with an EMV (Europay, MasterCard, and Visa) card to process the payment with the personal processing device and prompt the cardholder to couple the EMV card with the personal processing device to process the payment. The secure element may then interact with EMV card of the cardholder via the card reader to obtain a packet to process the payment (element 325). In other embodiments, a different type of card reader may be activated to read the payment instrument of the user. And, in several embodiments, the EMV card may provide an encrypted packet or cryptogram to the secure element via the card reader to process the payment.

The secure element may encrypt communications to transmit an authorization request to the payment service provider to process the payment. The secure element may transmit the authorization request with encrypted communications via a secure element agent of the certified POS device and the authorization request may comprise the encrypted packet or cryptogram to verify that the card is present for the transaction (element 330). In several embodiments, the secure element may also include data to verify or indicate verification that the cardholder is present at or near to secure element. In other embodiments, the coupling of the payment instrument with the personal processing device may be sufficient to indicate that the cardholder is present at the POS transaction.

After transmitting the authorization request to the payment service provider, the secure element may receive an approval of the authorization request for the payment (element 335). And, thereafter, the secure element may receive a completed payment session communication from the payment service provider (element 340). The completed payment session communication may terminate the payment session and terminate the direct communications between the personal processing device and the payment service provider.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Further embodiments may include an apparatus to perform a point of sale transaction. The apparatus may comprise a processing device comprising an application processor, a secure element agent, and a network communications device, the processing device to interact with an online vendor; a card reader; and a secure element coupled with the card reader and the secure element agent, the secure element to communicate with a web site of the online vendor to process a payment to the online vendor as a certified Point of Sale (POS) device; to communicate with a payment service provider associated with the online vendor to process the payment in response to communication with the web site; to interact with the card reader to obtain a packet to process the payment with a payment instrument; to encrypt communications to transmit an authorization request to the payment service provider to process the payment with encrypted communications via the secure element agent, the authorization request to comprise the packet to verify that the card is present for the transaction; and to receive an approval of the authorization request for the payment.

In some embodiments, the secure element comprises logic to start a payment session with the payment service provider and to activate the card reader to process the payment for the online vendor. In some embodiments, the card reader comprises one or more of a near field communication radio and antenna to communicate with the payment instrument, a magnetic medium reader, an optical medium reader, and contacts for a contacted connection. In some embodiments, the secure element comprises logic to communicate a message from the payment service provider to a user to prompt the user to process the payment with the payment instrument and the card reader. In some embodiments, the secure element comprises logic to dynamically bind the certified POS device to the online vendor to process the payment by a user of the certified POS device for the online vendor. In some embodiments, the secure element comprises logic to dynamically bind the certified POS device to the payment service provider to process the payment by a user of the certified POS device for online vendor.

Another embodiment comprises one or more tangible computer-readable non-transitory storage media comprising computer-executable instructions. The computer-executable instructions may be operable to, when executed by at least one computer processor, enable the at least one computer processor to implement a method. The method may involve communicating, by a certified Point of Sale (POS) device, with a web site of an online vendor to process a payment to the online vendor; communicating with a payment service provider associated with the online vendor to process the payment in response to communicating with the web site; interacting with a card reader to obtain a packet to process the payment with a payment instrument; encrypting communications to transmit an authorization request to the payment service provider to process the payment with encrypted communications via a secure element agent of the certified POS device, the authorization request to comprise the packet to verify that the card is present for the transaction; and receiving an approval of the authorization request for the payment.

In some embodiments, the method further comprising activating a near field communication radio or contact interface to interact with an EMV (Europay, MasterCard and Visa) card to process the payment. In some embodiments, the method further comprises communicating a message from the payment service provider to a user to prompt the user to process the payment with the payment instrument and the card reader. In some embodiments, the method further comprises dynamically binding the certified POS device to the online merchant to process the payment by a user of the certified POS device for the online vendor. In some embodiments, the method further comprises dynamically binding the secure element as a POS device to the payment service provider to process the payment by a user of the certified POS device for the online vendor.

Further embodiments may include a method to perform a point of sale transaction. The method may involve communicating, by a certified Point of Sale (POS) device, with a web site of an online vendor to process a payment to the online vendor; communicating with a payment service provider associated with the online vendor to process the payment in response to communicating with the web site; interacting with a card reader to obtain a packet to process the payment with a payment instrument; encrypting communications to transmit an authorization request to the payment service provider to process the payment with encrypted communications via a secure element agent of the certified POS device, the authorization request to comprise the packet to verify that the card is present for the transaction; and receiving an approval of the authorization request for the payment.

In some embodiments, the method may further comprise activating a near field communication radio or contact interface to interact with an EMV (Europay, MasterCard, and Visa) card to process the payment. In some embodiments, the method may further comprise communicating a message from the payment service provider to a user to prompt the user to process the payment with the payment instrument and the card reader. In some embodiments, the method may further comprise dynamically binding the certified POS device to the online vendor to process the payment by a user of the certified POS device for the online vendor. In some embodiments, the method may further comprise dynamically binding the certified POS device to the payment service provider to process the payment by a user of the certified POS device for the online vendor.

Further embodiments may include a system to perform a point of sale transaction. The system may comprise a processing device comprising an application processor, a secure element agent, and a network communications device, the processing device to comprise logic to interact with an online vendor; a card reader; and a secure element coupled with the card reader and the secure element agent, the secure element to communicate with a web site of the online vendor to process a payment to the online vendor as a certified Point of Sale (POS) device; to communicate with a payment service provider associated with the online vendor to process the payment in response to communication with the web site; to interact with the card reader to obtain a packet to process the payment with a payment instrument; to encrypt communications to transmit an authorization request to the payment service provider to process the payment with encrypted communications via the secure element agent, the authorization request to comprise the packet to verify that the card is present for the transaction; and to receive an approval of the authorization request for the payment; a memory coupled with the application processor; medium access control logic coupled with the memory to determine and decode wireless communications; one or more antennas; and one or more radios coupled with corresponding ones of the one or more antennas to transmit and receive wireless communications.

In some embodiments, the secure element comprises logic to start a payment session with the payment service provider and to activate the near field communication radio or contact interface to process the payment for the online vendor. In some embodiments, the card reader comprises one or more of a near field communication radio and antenna, a magnetic medium reader, an optical medium reader, and contacts for a contacted connection to communicate with the payment instrument. In some embodiments, the secure element comprises logic to communicate a message from the payment service provider to a user to prompt the user to process the payment with the payment instrument and the card reader. In some embodiments, the secure element comprises logic to dynamically bind the certified POS device to the online vendor to process the payment by a user of the certified POS device for the online vendor. In some embodiments, the secure element comprises logic to dynamically bind the certified POS device to the payment service provider to process the payment by a user of the certified POS device for online vendor.

Further embodiments may include a system to perform a point of sale transaction. The apparatus may comprise a means for communicating, by a certified Point of Sale (POS) device, with a web site of an online vendor to process a payment to the online vendor; a means for communicating with a payment service provider associated with the online vendor to process the payment in response to communicating with the web site; a means for interacting with a card reader to obtain a packet to process the payment with a payment instrument; a means for encrypting communications to transmit an authorization request to the payment service provider to process the payment with encrypted communications via a secure element agent of the certified POS device, the authorization request to comprise the packet to verify that the card is present for the transaction; a means for receiving an approval of the authorization request for the payment.

In some embodiments, the system may further comprise a means for activating a near field communication radio or contact interface to interact with an EMV (Europay, MasterCard and Visa) card to process the payment. In some embodiments, the system may further comprise a means for communicating a message from the payment service provider to a user to prompt the user to process the payment with the payment instrument and the card reader. In some embodiments, the system may further comprise a means for dynamically binding the certified POS device to the online vendor to process the payment by a user of the certified POS device for the online vendor. In some embodiments, the system may further comprise a means for dynamically binding the certified POS device to the payment service provider to process the payment by a user of the certified POS device for the online vendor.

Another embodiment is implemented as a program product for implementing systems, apparatuses, and methods described with reference to FIGS. 1-3. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A device for a point of sale transaction, the device comprising:
   a processing device comprising an application processor, a secure element agent, and a network communications device, the processing device to dynamically interact with an online vendor, wherein the secure element agent to securely control the application processor to pass encrypted communications between a secure element and a payment service provider associated with the online vendor via the network communications device; and
   a certified Point of Sale (POS) device to dynamically bind the secure element to the payment service provider associated with the online vendor to process a payment, the certified POS device comprising:
   a card reader; and
   the secure element operatively coupled with the card reader and the secure element agent, the secure element to communicate with a web site of the online vendor to process the payment to the online vendor; to communicate via a network with the payment service provider associated with the online vendor to process the payment in response to communication with the web site; to dynamically bind the certified POS device to the payment service provider to process the payment by a user of the certified POS device for online vendor; to interact with the card reader to obtain a packet to process the payment with a card; to encrypt communications to transmit an authorization request to the payment service provider to process the payment with encrypted communications via the secure element agent, the authorization request to comprise the packet to verify that the card is present for the transaction; and to receive an approval of the authorization request for the payment from the payment service provider.

2. The device of claim 1, wherein the secure element comprises logic to start a payment session with the payment service provider and to activate the card reader to process the payment for the online vendor.

3. The device of claim 1, wherein the card reader comprises one or more of a near field communication radio and antenna to communicate with the card, a magnetic medium reader, an optical medium reader, and contacts for a contacted connection.

4. The device of claim 1, wherein the secure element comprises logic to communicate a message from the payment service provider to a user to prompt the user to process the payment with the card and the card reader.

5. The device of claim 1, wherein the secure element comprises logic to dynamically bind the certified POS device to the online vendor to process the payment by a user of the certified POS device for the online vendor.

6. One or more tangible computer-readable non-transitory storage media comprising computer-executable instructions operable to, when executed by at least one computer processor, enable the at least one computer processor to implement a method comprising:
   communicating, by a consumer device comprising a certified Point of Sale (POS) device, with a web site of an online vendor to process a payment to the online vendor;
   communicating via a network, by a secure element of the certified Point of Sale (POS) device, with a payment service provider associated with the online vendor to process the payment in response to communicating with the web site;
   dynamically binding, by the secure element, the certified POS device to the payment service provider associated with the online vendor dynamically to process the payment by a user of the certified POS device for online vendor;
   interacting, by the secure element, with a card reader of the certified Point of Sale (POS) device to obtain a packet to process the payment with a card;
   encrypting communications to transmit an authorization request to the payment service provider to process the payment with encrypted communications via a secure element agent of the consumer device, the authorization request to comprise the packet to verify that the card is present for the transaction, wherein the secure element agent comprises an application to execute on an application processor of the at least one computer processor to pass encrypted communications between a secure element and a payment service provider via a network communications device; and receiving an approval of the authorization request for the payment from the payment service provider.

7. The storage media of claim 6, wherein the method further comprises activating a near field communication radio or contact interface to interact with an EMV (Europay, MasterCard and Visa) card to process the payment.

8. The storage media of claim 6, wherein the method further comprises communicating a message from the payment service provider to a user to prompt the user to process the payment with the card and the card reader.

9. The storage media of claim 6, wherein the method further comprises dynamically binding the certified POS device to the online vendor to process the payment by a user of the certified POS device for the online vendor.

10. A method for a point of sale transaction, the method comprising:

communicating, by a consumer device comprising a certified Point of Sale (POS) device, with a web site of an online vendor to process a payment to the online vendor;

communicating via a network, by a secure element of the certified Point of Sale (POS) device, with a payment service provider associated with the online vendor to process the payment in response to communicating with the web site;

dynamically binding, by the secure element, the certified POS device to the payment service provider associated with the online vendor dynamically to process the payment by a user of the certified POS device for online vendor;

interacting, by the secure element, with a card reader of the certified Point of Sale (POS) device to obtain a packet to process the payment with a card;

encrypting communications to transmit an authorization request to the payment service provider to process the payment with encrypted communications via a secure element agent of the consumer device, the authorization request to comprise the packet to verify that the card is present for the transaction, wherein the secure element agent comprises an application to execute on an application processor to pass encrypted communications between a secure element and a payment service provider via a network communications device; and receiving an approval of the authorization request for the payment from the payment service provider.

11. The method of claim 10, further comprising activating a near field communication radio or contact interface to interact with an EMV (Europay, MasterCard and Visa) card to process the payment.

12. The method of claim 10, further comprising communicating a message from the payment service provider to a user to prompt the user to process the payment with the card and the card reader.

13. The method of claim 10, further comprising dynamically binding the certified POS device to the online vendor to process the payment by a user of the certified POS device for the online vendor.

14. A system for a point of sale transaction, the system comprising:

a processing device comprising an application processor, a secure element agent, and a network communications device, the processing device to comprise logic to interact with an online vendor, wherein the secure element agent comprises an application to execute on the application processor to pass encrypted communications between a secure element and a payment service provider associated with the online vendor via the network communications device;

a memory coupled with the application processor;

medium access control logic coupled with the memory to determine and decode wireless communications;

one or more antennas; and one or more radios coupled with corresponding ones of the one or more antennas to transmit and receive wireless communications; and a certified Point of Sale (POS) device to dynamically bind the secure element to the payment service provider associated with the online vendor to process a payment, the certified POS device comprising:

a card reader; and the secure element operatively coupled with the card reader and the secure element agent, the secure element to communicate with a web site of the online vendor to process a payment to the online vendor; to communicate via a network with the payment service provider associated with the online vendor to process the payment in response to communication with the web site; to dynamically bind the certified POS device to the payment service provider to process the payment by a user of the certified POS device for online vendor; to interact with the card reader to obtain a packet to process the payment with a card; to encrypt communications to transmit an authorization request to the payment service provider to process the payment with encrypted communications via the secure element agent, the authorization request to comprise the packet to verify that the card is present for the transaction; and to receive an approval of the authorization request for the payment from the payment service provider.

15. The system of claim 14, wherein the secure element comprises logic to start a payment session with the payment service provider and to activate a near field communication radio or contact interface to process the payment for the online vendor.

16. The system of claim 14, wherein the card reader comprises one or more of a near field communication radio and antenna, a magnetic medium reader, an optical medium reader, and contacts for a contacted connection to communicate with the card.

17. The system of claim 14, wherein the secure element comprises logic to communicate a message from the payment service provider to a user to prompt the user to process the payment with the card and the card reader.

18. The system of claim 14, wherein the secure element comprises logic to dynamically bind the certified POS device to the online vendor to process the payment by a user of the certified POS device for the online vendor.

19. An apparatus for a point of sale transaction, the apparatus comprising:

a means for communicating, by a consumer device comprising a certified Point of Sale (POS) device, with a web site of an online vendor to process a payment to the online vendor;

a means for communicating via a network, by a secure element of the certified Point of Sale (POS) device, with a payment service provider associated with the online vendor to process the payment in response to communicating with the web site;

a means for dynamically binding, by the secure element, the certified POS device to the payment service provider associated with the online vendor dynamically to process the payment by a user of the certified POS device for online vendor;

a means for interacting, by the secure element, with a card reader of the certified Point of Sale (POS) device to obtain a packet to process the payment with a card;

a means for encrypting communications to transmit an authorization request to the payment service provider to process the payment with encrypted communications via a secure element agent of the consumer device, the authorization request to comprise the packet to verify that the card is present for the transaction, wherein the secure element agent comprises an application to execute on the application processor to pass encrypted communications between a secure element and a payment service provider via a network communications device;

a means for receiving an approval of the authorization request for the payment from the payment service provider.

20. The apparatus of claim 19, further comprising a means for dynamically binding the certified POS device to the online vendor to process the payment by a user of the certified POS device for the online vendor.

* * * * *